(12) United States Patent
Chang

(10) Patent No.: US 7,819,593 B2
(45) Date of Patent: Oct. 26, 2010

(54) LENS MODULE AND CAMERA HAVING SAME

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 189 days.

(21) Appl. No.: 12/251,691

(22) Filed: Oct. 15, 2008

(65) Prior Publication Data
US 2009/0169198 A1    Jul. 2, 2009

(30) Foreign Application Priority Data
Dec. 27, 2007    (CN) .......................... 2007 1 0203434

(51) Int. Cl.
*G03B 17/00* (2006.01)
(52) U.S. Cl. ....................... 396/529; 359/826
(58) Field of Classification Search ................ 396/529; 359/819, 822, 826
See application file for complete search history.

(56) References Cited

U.S. PATENT DOCUMENTS

| | | | | |
|---|---|---|---|---|
| 2002/0005997 A1* | 1/2002 | Oba | .......................... | 359/819 |
| 2006/0114580 A1* | 6/2006 | Mori et al. | ................... | 359/819 |
| 2006/0209205 A1* | 9/2006 | Tsai | ........................... | 348/373 |
| 2008/0131110 A1* | 6/2008 | Lee et al. | ..................... | 396/144 |
| 2008/0192366 A1* | 8/2008 | Chang | ........................ | 359/817 |

* cited by examiner

*Primary Examiner*—Rodney E Fuller
*Assistant Examiner*—Fang-Chi Chang
(74) *Attorney, Agent, or Firm*—Andrew C. Cheng

(57) ABSTRACT

A lens module includes a lens, a lens module and a base. The lens barrel receives the lens therein. The lens barrel includes a hollow cylindrical body, a beveled distal end and a flange. The hollow cylindrical body includes a smooth peripheral side surface free of thread formed thereon. The flange extends outwardly from the cylindrical body. The flange defines an annular groove in a peripheral surface thereof. The base includes a hollow cylindrical holding body coaxially receiving the cylindrical body therein. The holding body has a first distal end, a second distal end and an inner smooth surface. The beveled distal end is configured for facilitating insertion of the cylindrical body in the cylindrical holding body. The flange is configured for being clamped by a tool and being moved toward or away from the base using the tool.

13 Claims, 5 Drawing Sheets

LENS MODULE AND CAMERA HAVING SAME

BACKGROUND

1. Field of the Invention

The present invention relates to a lens module and a camera having the lens module.

2. Description of Related Art

The ongoing development in microcircuitry and multimedia technology has made digital cameras popular and in widespread use. Portable electronic devices, such as mobile phones and personal digital assistants (PDAs), are being developed to be increasingly multi-functional. Many of these portable electronic devices are now equipped with a camera module. The camera module generally includes an optical module, which includes a lens barrel and a holder for receiving the lens barrel.

Generally, the lens barrel is mounted in the holder via screw threads. It is desirable to maintain a torque force between the lens barrel and the holder in an appropriate range. If the torque force is too strong, the rotation between the lens barrel and the holder will become difficult. If the torque force is too weak, the lens barrel may deviate from the holder and result in eccentricity between the lens barrel and the holder.

Furthermore, regarding screw thread connection products, the structure of the screw thread teeth and the spaces between adjacent screw thread teeth may require a relatively high manufacturing precision and a relatively complex manufacturing process. Therefore, the screw thread connection configuration used in the optical lens module may obstruct the miniaturization of the electronic product and/or may inhibit the effective mass manufacture thereof.

Therefore, an optical lens module with a simple manner for assembling the barrel and the holder is desired.

SUMMARY

A lens module includes a lens, a lens module and a base. The lens barrel receives the lens therein. The lens barrel includes a hollow cylindrical body, a beveled distal end and a flange. The hollow cylindrical body includes a smooth peripheral side surface free of thread formed thereon. The flange extends outwardly from the cylindrical body. The flange defines an annular groove in a peripheral surface thereof. The base includes a hollow cylindrical holding body coaxially receiving the cylindrical body therein. The holding body has a first distal end, a second distal end and an inner smooth surface. The beveled distal end is configured for facilitating insertion of the cylindrical body in the cylindrical holding body. The flange is configured for being clamped by a tool and being moved toward or away from the base using the tool.

Advantages and novel features will become more apparent from the following detailed description when taken in conjunction with the accompanying drawings.

BRIEF DESCRIPTION OF THE DRAWINGS

Many aspects of the present lens module and camera can be better understood with reference to the following drawings. The components in the drawings are not necessarily drawn to scale, the emphasis instead being placed upon clearly illustrating the principles of the present lens module and camera. Moreover, in the drawings, like reference numerals designate corresponding parts throughout the several views.

DETAILED DESCRIPTION OF THE EMBODIMENTS

Reference will now be made to the drawings to describe the embodiments of the present lens module and camera, in detail.

Figure 1:
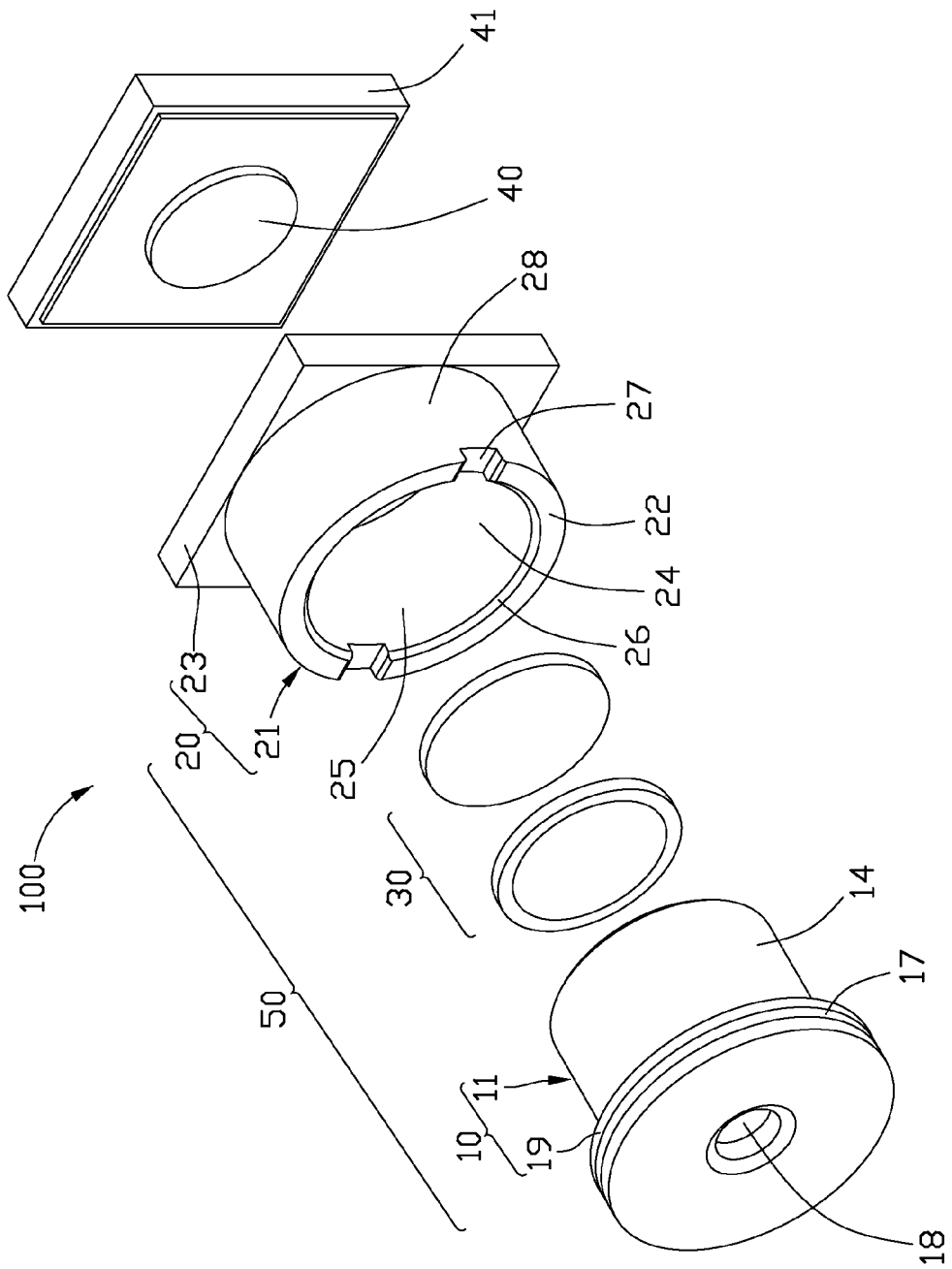
FIG. 1 is an exploded perspective view of an exemplary embodiment of a camera including a lens barrel and a holder.

Referring to FIG. 1, a camera 100 includes a lens module 50 and an image sensor 40. The lens module 50 includes a lens barrel 10, a base 20 for receiving and holding the lens barrel 10, and a lens group 30.

Figure 2:
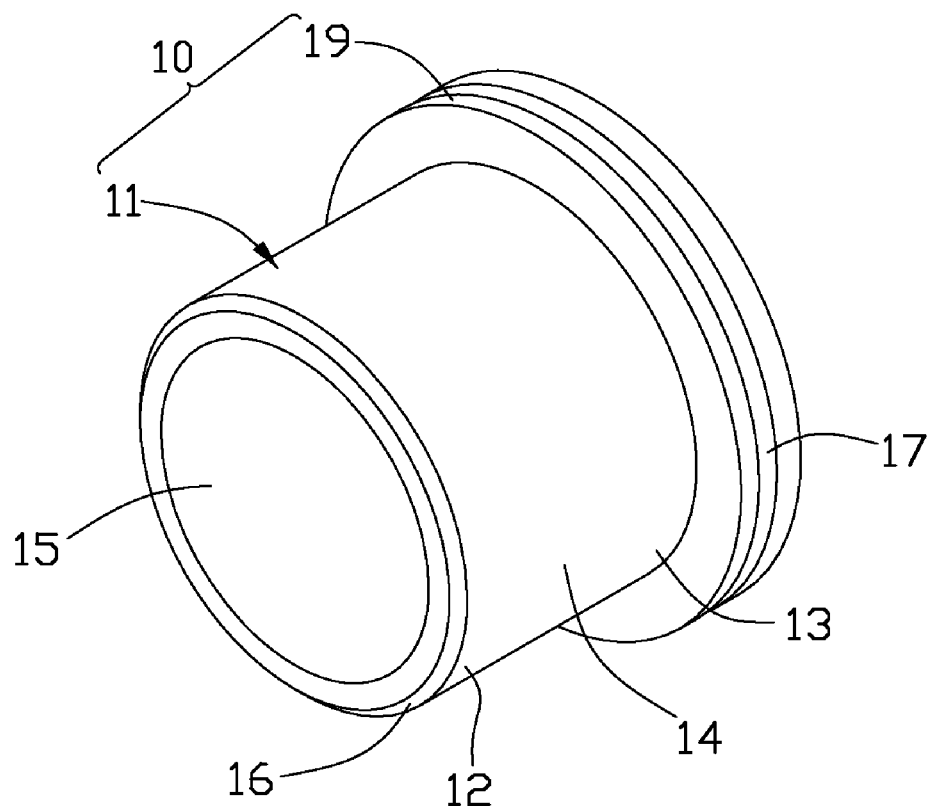
FIG. 2 is an isometric view of the lens barrel of the lens module shown in FIG. 1 viewed from another aspect.

Referring to FIG. 2, the lens barrel 10 includes a hollow cylindrical body 11 having a partially-closed end 13 and an open end 12. The open end 12 is opposite to the partially-closed end 13. A peripheral side surface of the cylindrical body 11 is smooth and free of thread formed thereon. A cylindrical receiving cavity 15 is defined in the cylindrical body 11. The lens group 30 is received in the receiving cavity 15. In this embodiment, the lens group 30 includes two lenses coaxially aligned. The open end 12 includes a beveled distal end 16 having a conical shape coaxial with the hollow cylindrical body 11.

A flange 19 extends outwardly from the main portion of the cylindrical body 11. The flange 19 serves to retain the lens group 30 within the lens barrel 10 and also defines a light aperture 18 through which light passing through the lens barrel 10 may travel. An annular groove 17 is defined in a peripheral surface of the flange 19.

The base 20 includes a holding body 21 and a supporting portion 23. The holding body 21 is a hollow cylindrical body. The holding body 21 has a first distal end 22, a second distal end (not labeled) opposite to the first distal end 22, an inner surface 25 and an outer surface 28 opposite to the inner surface 25. The inner surface 25 and the outer surface 28 are adjacent to both of the first distal end 22 and the second distal end of the holding body 21. A receiving housing 24 is defined in the holding body 21. The inner surface 25 is smooth. The receiving housing 24 of the base 20 has a cylinder shape corresponding to the cylindrical body 11 for receiving the cylindrical body 11 therein. A diameter of the receiving housing 24 is essentially equal to an external diameter of the cylindrical body 11 where the lateral surface 14 of the cylindrical body 11 is located. A guiding surface 26 is defined in the inner surface 25 of the receiving housing 24 and adjacent to the first distal end 22. The guiding surface 26 is a conical surface for guiding the cylindrical body 11 into the receiving housing 24. When the cylindrical body 11 is received in the receiving housing 24 (see FIG. 3), the lens barrel 10, the receiving housing 24, and the lens group 30 carried within the lens barrel 10, all share an optical axis. Two grooves 27 are defined in the first distal end 22. The two grooves 27 are in communication with the receiving housing 24 and the outer surface 28 of the holding body 21. The grooves 27 are configured for entrance of adhesive into the receiving housing 24.

It is understood that one of the beveled distal end 16 and the guiding surface 26 can facilitate insertion of the cylindrical body 11 in the receiving housing 24. Therefore, in an alternative embodiment, the cylindrical body 11 can also be guided into the receiving housing 24 without the beveled distal end 16 or the guiding surface 26.

The supporting portion 23 can be integrally formed with the second distal end of the holding body 21. The supporting portion 23 has a rectangle shape and also defines a through hole (not shown) therein through which light passing through the lens barrel 10 may travel.

The image sensor 40 is mounted in the middle portion of a surface of a sensor base 41. The sensor base 41 has a rectangle shape corresponding to the supporting portion 23. The sensor base 41 is fastened to the supporting portion 23 by using, for example, adhesive or bolts. Wherein the image sensor 40 is set adjacent to the supporting portion 23 and optically coupled to the lens group 30. In an alternative embodiment, the supporting portion 23 is rectangle-shaped without a through hole defined therein and the image sensor 40 is mounted on a surface of the supporting portion 23 adjacent to the holding body 21.

Figure 3:
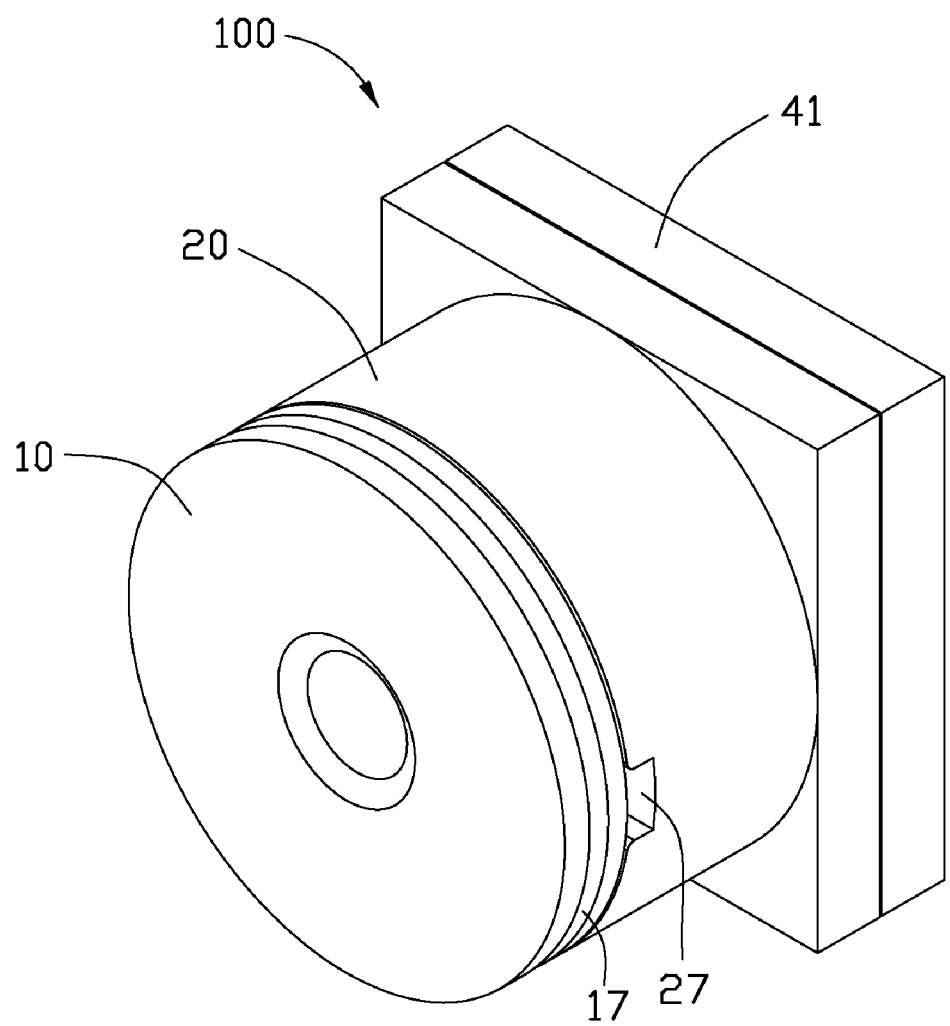
FIG. 3 is an assembled view of the camera shown in FIG. 1.

Referring to FIG. 3, all of the components described above are assembled together to form the camera 100. The lens group 30 is installed in the cylindrical body 11. The cylindrical body 11 is inserted into the receiving housing 24, wherein the beveled distal end 16 is received in the receiving housing 24 of the holding body 21. The cylindrical body 11 and the holding body 21 adhere to each other by applying adhesive between the lateral surface 14 of the cylindrical body 11 and the inner surface 25 of the holding body 21. The sensor base 41 is fastened to the supporting portion 23 by using adhesive.

Figure 4:
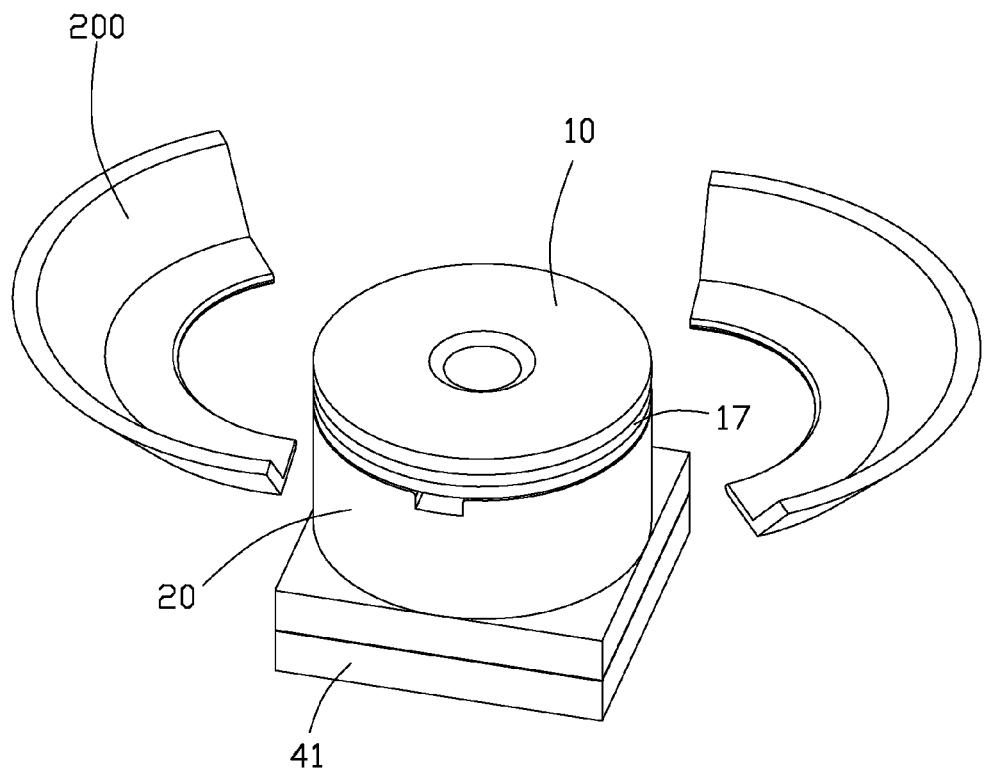
FIG. 4 is an isometric view of an early stage of the process of a method for assembling the camera shown in FIG. 3.
Figure 5:
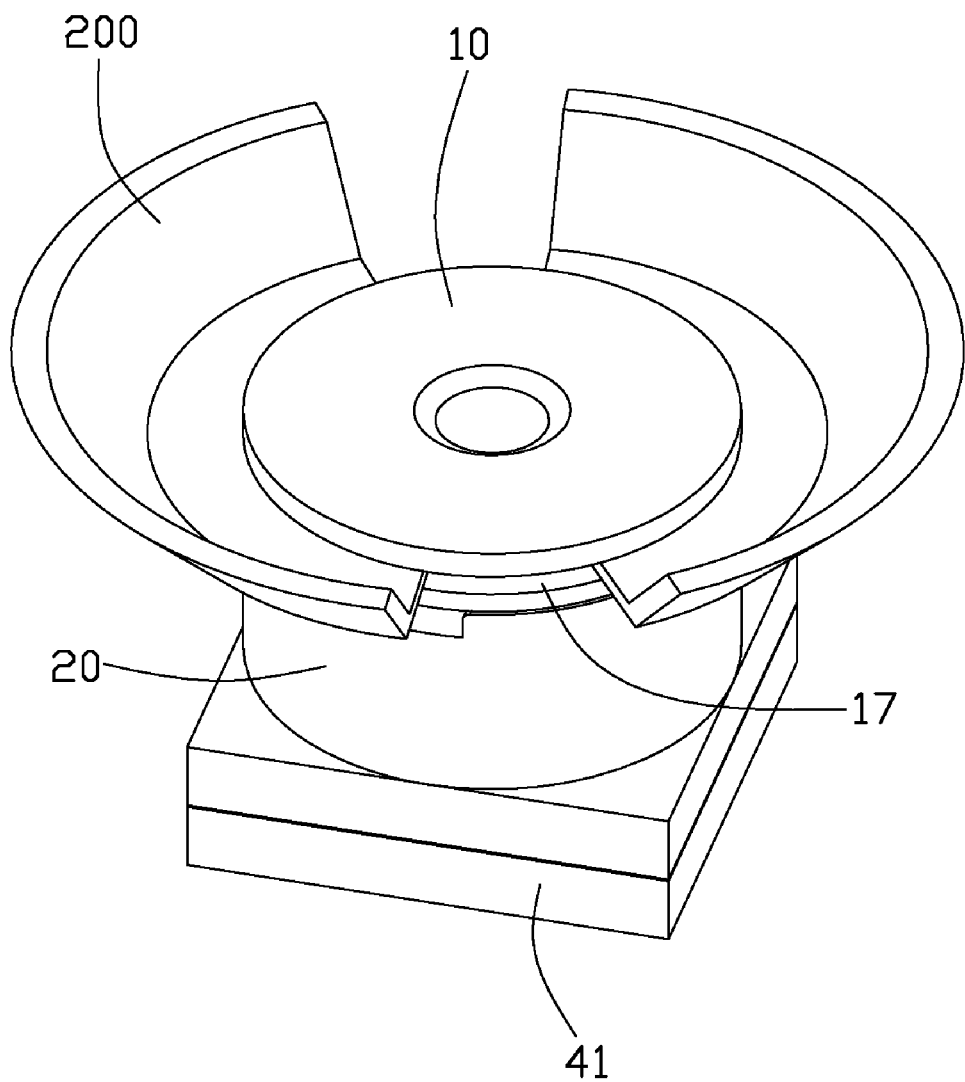
FIG. 5 is an isometric view of the latter stage of the process of the method for assembling the camera shown in FIG. 3.

Referring to FIGS. 1, 4 and 5, an embodiment of a method for assembling the camera 100 is illustrated. The method is as follows:

The cylindrical body 11 of the lens barrel 10 is inserted into the receiving housing 24 of the holding body 21. The beveled distal end 16 and the guiding surface 26 make it easy for the cylindrical body 11 to be inserted into the receiving housing 24.

A gripping device 200 for gripping the gripping portion 13 is provided. The gripping device 200 includes two gripping jaws set opposite to each other. The two gripping jaws of the gripping device 200 can be drawn close each other to gripping the gripping portion 13 via partly inserting the two gripping jaws into the annular groove 17. The gripping device 200 is moved along a direction parallel with the principal axis of the lens barrel 10 to adjust the position of the lens barrel 10 relative to the base 20.

Adhesive is deposited in the receiving housing 24 between the inner surface 25 of the holding body 21 and the lateral surface 14 of the cylindrical body 11 through the two grooves 27. The cylindrical body 11 and the holding body 21 adhere to each other by the adhesive. Finally, the sensor base 41 adheres to the supporting portion 23 via adhesive. Thus, the camera 100 is assembled together.

The camera 100 of this embodiment includes a lens barrel 10 and a base 20, both of which have no screw thread. Therefore, the manner of assembling the lens barrel 10 and the base 20 together becomes simple.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens module comprising:
    a lens;
    a lens barrel receiving the lens therein, the lens barrel comprising:
        a hollow cylindrical body comprising a smooth peripheral side surface free of thread formed thereon;
        a beveled distal end; and
        a flange extending outwardly from the cylindrical body, the flange defining an annular groove in a peripheral surface thereof; and
    a base comprising:
        a hollow cylindrical holding body coaxially receiving the cylindrical body therein, the holding body having a first distal end, a second distal end and an inner smooth surface, the beveled distal end configured for facilitating insertion of the cylindrical body in the cylindrical holding body, the flange configured for being clamped by a tool and being moved toward or away from the base using the tool.

2. The lens module of claim 1, wherein the holding body further comprises a conical guiding surface at the first distal end for guiding the cylindrical body to be inserted into the cylindrical holding body.

3. The lens module of claim 1, wherein the holding body further comprises a cutout defined in the first distal end.

4. The lens module of claim 1, wherein the beveled distal end has a conical shape and is coaxial with the cylindrical body.

5. The lens module of claim 4, wherein a diameter of the beveled distal end is greater than that of the cylindrical body.

6. A camera comprising:
    a lens;
    a lens barrel receiving the lens therein, the lens barrel comprising:
        a hollow cylindrical body comprising a smooth peripheral side surface free of thread formed thereon, and a beveled distal end, and
        a flange extending outwardly from the cylindrical body, the flange defining an annular groove in a peripheral surface thereof;
    a base comprising a hollow cylindrical holding body coaxially receiving the cylindrical body therein, the holding body having a first distal end, a second distal end and an inner smooth surface, the beveled distal end configured for facilitating insertion of the cylindrical body in the cylindrical holding body, the flange configured for being clamped by a tool and being moved toward or away from the base using the tool; and
    an image sensor optically coupled to the lens module.

7. The camera of claim 6, further comprising a sensor base, the image sensor being mounted on the sensor base, the sensor base being fastened to the base.

8. The camera of claim 7, wherein the lens module further comprises a supporting portion, a through hole being defined in the supporting portion, the sensor base being fastened to the supporting portion and the image sensor being exposed to the lens through the through hole of the supporting portion.

9. The camera of claim 6, wherein the holding body further comprises a conical guiding surface at the first distal end for guiding the cylindrical body to be inserted into the cylindrical holding body.

10. The camera of claim 6, wherein the holding body further comprises a cutout defined in the first distal end.

11. The camera of claim 6, wherein the beveled distal end has a conical shape and is coaxial with the cylindrical body.

12. The camera of claim 11, wherein a diameter of the beveled distal end is greater than that of the cylindrical body.

13. The camera of claim 10, wherein glue is cured in the cutout.

* * * * *